US011622275B2

(12) United States Patent
Gulick, Jr. et al.

(10) Patent No.: US 11,622,275 B2
(45) Date of Patent: Apr. 4, 2023

(54) GEO-RADIUS BASED MOBILE DEVICE MANAGEMENT

(71) Applicant: Scorpion Security Products, Inc., Vestal, NY (US)

(72) Inventors: Franklyn W. Gulick, Jr., Binghamton, NY (US); Grant William Gulick, Endwell, NY (US)

(73) Assignee: SCORPION SECURITY PRODUCTS, INC., Vestal, NY (US)

( * ) Notice: Subject to any disclaimer, the term of this patent is extended or adjusted under 35 U.S.C. 154(b) by 119 days.

(21) Appl. No.: 17/153,502

(22) Filed: Jan. 20, 2021

(65) Prior Publication Data

US 2021/0144557 A1   May 13, 2021

Related U.S. Application Data

(63) Continuation-in-part of application No. 16/899,136, filed on Jun. 11, 2020, now Pat. No. 11,337,074,
(Continued)

(51) Int. Cl.
*H04W 48/10*   (2009.01)
*H04W 12/126*   (2021.01)
(Continued)

(52) U.S. Cl.
CPC ............ *H04W 12/126* (2021.01); *G08B 7/06* (2013.01); *H04L 43/10* (2013.01); *H04W 4/021* (2013.01);
(Continued)

(58) Field of Classification Search
CPC . H04W 12/1206; H04W 4/021; H04W 48/10; H04W 4/029; H04W 12/002; G08B 7/06; H04L 43/10
See application file for complete search history.

(56) References Cited

U.S. PATENT DOCUMENTS

| 4,851,815 A | 7/1989 | Enkelmann |
| 5,151,684 A | 9/1992 | Johnsen |

(Continued)

FOREIGN PATENT DOCUMENTS

| AU | 2012254998 A1 | 12/2013 |
| CA | 2636293 A1 | 8/2007 |

(Continued)

OTHER PUBLICATIONS

National Intellectual Property Administration, P.R. China, Second Office Action and Search Report, Application No. 201880025942.1, dated Mar. 3, 2021, (5 pages).

(Continued)

*Primary Examiner* — Chuong A Ngo
(74) *Attorney, Agent, or Firm* — Barclay Damon LLP

(57) ABSTRACT

A mobile device management system and method. The mobile device includes a global positioning system (GPS) tracker for locating the mobile device. The method includes establishing a zone boundary defining a first zone and a second zone in a monitoring area using the GPS tracker, wherein the mobile device is maintained in a first operating mode when the mobile device is located in the first zone and a second operating mode when the mobile device is located in the second zone; sending one or more characteristics of the zone boundary to a management system; receiving at least one change to the one or more characteristics of the zone boundary from the management system; and upon the mobile device being located outside the first zone for longer than a predetermined time period, performing alert actions.

18 Claims, 10 Drawing Sheets

Related U.S. Application Data which is a continuation of application No. 16/485,050, filed as application No. PCT/US2018/018914 on Feb. 21, 2018, now Pat. No. 10,708,785.

(60) Provisional application No. 63/054,544, filed on Jul. 21, 2020, provisional application No. 62/578,232, filed on Oct. 27, 2017, provisional application No. 62/461,448, filed on Feb. 21, 2017.

(51) Int. Cl.
| | |
|---|---|
| *H04W 4/029* | (2018.01) |
| *G08B 7/06* | (2006.01) |
| *H04W 12/30* | (2021.01) |
| *H04W 4/021* | (2018.01) |
| *H04L 43/10* | (2022.01) |

(52) U.S. Cl.
CPC ........... *H04W 4/029* (2018.02); *H04W 12/30* (2021.01); *H04W 48/10* (2013.01)

(56) References Cited

U.S. PATENT DOCUMENTS

| | | | |
|---|---|---|---|
| 5,438,319 A | 8/1995 | Zeytoonjian | |
| 5,552,773 A | 9/1996 | Kuhnert | |
| 6,907,254 B1 | 6/2005 | Westfield | |
| 7,218,226 B2 | 5/2007 | Wehrenberg | |
| 7,490,720 B2 | 2/2009 | Cole et al. | |
| 7,498,985 B1 | 3/2009 | Woo | |
| 7,548,161 B2 | 6/2009 | Wehrenberg | |
| 7,561,102 B2 | 7/2009 | Duvall | |
| 7,696,887 B1 | 4/2010 | Echavarria | |
| 7,714,265 B2 | 5/2010 | Fadell et al. | |
| 7,986,233 B2 | 7/2011 | Wehrenberg | |
| 8,018,329 B2 | 9/2011 | Morgan et al. | |
| 8,217,792 B2 | 7/2012 | Wehrenberg | |
| 8,242,910 B2 | 8/2012 | Skjellerup | |
| 8,279,077 B1 | 10/2012 | Liff et al. | |
| 8,378,823 B2 | 2/2013 | Eckert et al. | |
| 8,472,203 B2 | 6/2013 | Dabov et al. | |
| 8,531,296 B2 | 9/2013 | Wehrenberg | |
| 8,536,507 B2 | 9/2013 | Fadell et al. | |
| 8,539,590 B2 | 9/2013 | Lee et al. | |
| 8,558,714 B1 | 10/2013 | Liff et al. | |
| 8,587,662 B1 | 11/2013 | Moll | |
| 8,626,187 B2 | 1/2014 | Grosman et al. | |
| 8,712,432 B2 | 4/2014 | Loveland | |
| 8,717,172 B2 | 5/2014 | Parker et al. | |
| 8,745,383 B2 | 6/2014 | Tarkhanyan et al. | |
| 8,829,414 B2 | 9/2014 | Fadell et al. | |
| 8,878,672 B2 | 11/2014 | Parker et al. | |
| 8,878,673 B2 | 11/2014 | Grant | |
| 8,902,066 B2 | 12/2014 | Parker et al. | |
| 8,913,400 B2 | 12/2014 | Werner et al. | |
| 8,988,898 B2 | 3/2015 | Villarreal et al. | |
| 9,048,124 B2 | 6/2015 | Dolci et al. | |
| 9,105,899 B2 | 8/2015 | Pakula et al. | |
| 9,113,300 B2 | 8/2015 | Marti et al. | |
| 9,167,381 B2 | 10/2015 | McDonald et al. | |
| 9,173,061 B2 | 10/2015 | Varoglu et al. | |
| 9,179,538 B2 | 11/2015 | Foster et al. | |
| 9,191,832 B2 | 11/2015 | Marti et al. | |
| 9,210,545 B2 | 12/2015 | Sabatelli et al. | |
| 9,215,559 B2 | 12/2015 | Dave et al. | |
| 9,215,833 B2 | 12/2015 | Dolci et al. | |
| 9,223,345 B2 | 12/2015 | Dabov et al. | |
| 9,247,377 B2 | 1/2016 | Pai et al. | |
| 9,298,954 B1 | 3/2016 | Ewing | |
| 9,307,358 B2 | 4/2016 | Marti et al. | |
| 9,318,018 B2 | 4/2016 | Park et al. | |
| 9,373,236 B2 | 6/2016 | Oehl et al. | |
| 9,400,321 B2 | 7/2016 | Huang et al. | |
| 9,432,807 B2 | 8/2016 | Kern, Jr. et al. | |
| 9,445,235 B2 | 9/2016 | Marti et al. | |
| 9,495,318 B2 | 11/2016 | Balkan et al. | |
| 9,525,771 B2 | 12/2016 | Marti et al. | |
| 9,560,481 B1 | 1/2017 | Yocam et al. | |
| 9,600,049 B2 | 3/2017 | Pham et al. | |
| 9,706,032 B2 | 7/2017 | Pai et al. | |
| 9,743,234 B2 | 8/2017 | Varoglu et al. | |
| 9,749,797 B2 | 8/2017 | Marti et al. | |
| 9,749,800 B2 | 8/2017 | Bansal et al. | |
| 9,858,777 B2 | 1/2018 | Dandie et al. | |
| 9,894,196 B2 | 2/2018 | Marti et al. | |
| 10,002,505 B1 | 6/2018 | Grant et al. | |
| 10,080,103 B2 | 9/2018 | Kazemi et al. | |
| 10,103,934 B2 | 10/2018 | Pai et al. | |
| 10,217,337 B2 | 2/2019 | Marszalek et al. | |
| 10,218,835 B2 | 2/2019 | Marti et al. | |
| 10,223,553 B2 | 3/2019 | Snediker et al. | |
| 10,340,711 B2 | 7/2019 | Graham et al. | |
| 10,395,068 B2 | 8/2019 | Belk et al. | |
| 10,447,839 B2 | 10/2019 | Pai et al. | |
| 10,453,324 B2 * | 10/2019 | Minocha | G08B 25/016 |
| 10,462,284 B2 | 10/2019 | Marti et al. | |
| 10,645,534 B1 | 5/2020 | Klinkner | |
| 10,708,785 B2 | 7/2020 | Gulick, Jr. et al. | |
| 10,715,380 B2 | 7/2020 | Pai et al. | |
| 10,736,246 B2 | 8/2020 | Lee et al. | |
| 2003/0063003 A1 | 4/2003 | Bero | |
| 2004/0233042 A1 | 11/2004 | Piccoli | |
| 2004/0263327 A1 | 12/2004 | Hayes et al. | |
| 2005/0017855 A1 | 1/2005 | Harvey | |
| 2005/0091553 A1 | 4/2005 | Chien | |
| 2006/0026797 A1 | 2/2006 | Coyle | |
| 2006/0267575 A1 | 11/2006 | Sampson | |
| 2007/0035391 A1 | 2/2007 | Hamzy | |
| 2007/0182555 A1 | 8/2007 | Walker | |
| 2008/0083982 A1 | 4/2008 | Kelley et al. | |
| 2008/0125965 A1 | 5/2008 | Carani | |
| 2008/0143516 A1 | 6/2008 | Mock | |
| 2008/0204239 A1 | 8/2008 | Marszalek | |
| 2008/0291044 A1 | 11/2008 | Chan | |
| 2010/0148947 A1 | 6/2010 | Morgan et al. | |
| 2010/0275267 A1 | 10/2010 | Walker | |
| 2010/0277322 A1 | 11/2010 | Eckert | |
| 2011/0066371 A1 * | 3/2011 | Weiland | G01C 21/3673 |
| | | | 701/532 |
| 2011/0149078 A1 | 6/2011 | Fan | |
| 2011/0232585 A1 | 9/2011 | Rich | |
| 2012/0094769 A1 | 4/2012 | Nguyen | |
| 2012/0139723 A1 | 6/2012 | Avila et al. | |
| 2012/0293330 A1 | 11/2012 | Grant et al. | |
| 2013/0017840 A1 | 1/2013 | Moeglein | |
| 2013/0065648 A1 | 3/2013 | Kim | |
| 2013/0080289 A1 | 3/2013 | Roy | |
| 2013/0169434 A1 | 7/2013 | McCown | |
| 2013/0257616 A1 | 10/2013 | Taylor et al. | |
| 2013/0307692 A1 | 11/2013 | Fawcett et al. | |
| 2013/0321159 A1 | 12/2013 | Schofield | |
| 2014/0062695 A1 | 3/2014 | Rosen | |
| 2014/0118145 A1 | 5/2014 | Wawrzyniak et al. | |
| 2014/0351098 A1 | 11/2014 | Shafer | |
| 2015/0009034 A1 | 1/2015 | Grant et al. | |
| 2015/0091729 A1 | 4/2015 | Phillips et al. | |
| 2015/0348146 A1 | 12/2015 | Shanmugam et al. | |
| 2015/0365796 A1 | 12/2015 | Toni | |
| 2016/0142532 A1 | 5/2016 | Bostick | H04L 63/083 |
| | | | 455/411 |
| 2016/0307209 A1 | 10/2016 | Marszalek | |
| 2016/0307415 A1 | 10/2016 | Marszalek et al. | |
| 2016/0307416 A1 | 10/2016 | Marszalek et al. | |
| 2016/0308952 A1 | 10/2016 | Marszalek et al. | |
| 2017/0048665 A1 | 2/2017 | Yocam et al. | |
| 2017/0092087 A1 | 3/2017 | Grant et al. | |
| 2017/0093919 A1 * | 3/2017 | Pramanik | G06F 21/305 |
| 2017/0099577 A1 | 4/2017 | Yocam et al. | |
| 2017/0301198 A1 | 10/2017 | Grant et al. | |
| 2018/0293856 A1 | 10/2018 | Grant et al. | |

(56) References Cited

U.S. PATENT DOCUMENTS

2018/0349651 A1  12/2018  Snediker
2020/0051410 A1   2/2020  Grant et al.

FOREIGN PATENT DOCUMENTS

| CA | 2 911 794 A1 | 10/2016 |
|---|---|---|
| CA | 2 912 891 A1 | 10/2016 |
| CN | 105701986 A | 6/2016 |
| CN | 106023657 A | 10/2016 |
| DE | 198 22 670.5 A1 | 11/1999 |
| DE | 198 22 670 A1 | 11/1999 |
| DE | 10 2013 017245 A1 | 4/2014 |
| EP | 2710567 A1 | 3/2014 |
| EP | 3082091 A1 | 10/2016 |
| EP | 3093815 A1 | 11/2016 |
| GB | 2 137 391 B | 3/1984 |
| GB | 2 205 426 A | 9/1987 |
| WO | 2007/115097 A2 | 10/2007 |
| WO | 2010/127293 A1 | 11/2010 |
| WO | 2012159102 A1 | 11/2012 |
| WO | 2013/163333 A2 | 10/2013 |
| WO | 2014107184 A2 | 7/2014 |
| WO | 2016167968 A1 | 10/2016 |
| WO | 2016167969 A1 | 10/2016 |

OTHER PUBLICATIONS

European Patent Office, Supplementary European Search Report, Application No. EP 18756989, Date of Completion: Jul. 7, 2020, dated Nov. 6, 2020 (5 pages), the reference was not end with period.
Chinese National Intellectual Property Administration, First Office Action and Search Report, Appl. No. 201880025942.1, dated Aug. 3, 2020 (15 pages).
Partial Supplementary EP Search Report, Appl. No. 18756989.2, dated Jul. 16, 2020, (20 pages).
International Preliminary Report on Patentability, Int. Appl. No. PCT/US2010/033243, Applicant: Checkpoint Systems, Inc.; filed Apr. 30, 2010; dated Nov. 1, 2011 (8 pages).
EP Search Report, Appl. No. 15200006.3, dated Oct. 18, 2016, Sennco Solutions, Inc. (9 pages).
ISR/Written Opinion, Int. Appl. No.: PCT/US16/25036, Applicant: Sennco Solutions, LLC; filed Mar. 30, 2016, date of completion May 25, 2016 (7 pages).
ISR/Written Opinion, Int. Appl. No.: PCT/US16/25032, Applicant: Sennco Solutions, LLC; filed Mar. 30, 2016, date of completion May 28, 2016 (7 pages).
ISR/Written Opinion, Int. Appl.No. PCT/US18/018914, Applicant: Scorpion Security Products, Inc.; filed Feb. 21, 2018, date of completion Apr. 3, 2018 (12 pages).

* cited by examiner

GEO-RADIUS BASED MOBILE DEVICE MANAGEMENT

CROSS-REFERENCE TO RELATED APPLICATIONS

This application is a continuation-in-part of U.S. patent application Ser. No. 16/899,136, filed Jun. 11, 2020, which is a continuation of U.S. patent application Ser. No. 16/485,050, which issued as U.S. Pat. No. 10,708,785 on Jul. 7, 2020, and was filed Aug. 9, 2019, which is the National Stage of International Application No. PCT/US18/18914, filed Feb. 21, 2018, which claims priority to U.S. Provisional Patent Application Ser. No. 62/461,448, filed Feb. 21, 2017, and U.S. Provisional Patent Application Ser. No. 62/578,232, filed Oct. 27, 2017, and claims priority to U.S. Provisional Patent Application Ser. No. 63/054,544, filed Jul. 21, 2020, each of which is incorporated herein by reference in its entirety.

BACKGROUND

Retailers sell handheld electronic devices to the public in a range of shapes and sizes, with a range of functionality. Encouraging customers to examine and use the functionality of the devices at display locations is a valuable marketing technique employed by retailers. To decrease the risk of theft associated with this marketing strategy, retailers employ various security measures.

One common security measure is the use of an alarm sensor that is placed in contact with the surface of the handheld electronic device and alarms when it loses contact with the device (e.g., when the sensor is removed). A typical alarm sensor is attached to one portion of the handheld electronic device using an adhesive tape or similar adhesive product. During use, the adhesives often fail, resulting in the alarm sensor losing contact with the handheld electronic device and causing alarms to sound and startle innocent customers, negatively affecting their shopping experience. When these false alarms occur at a high frequency, retailers tend to ignore the alarms or even turn them off to avoid disrupting customer shopping experiences, leaving retailers vulnerable to theft. Furthermore, these alarm sensors are only activated when the alarm sensor loses contact with the portion of the handheld electronic devices to which it has been attached. For example, if the alarm sensor is attached to the battery cover of a wireless phone, a thief can remove and steal the remainder of the wireless phone (i.e., all components but the battery cover) without activating the alarm sensor. In order to combat this, retailers often install a plurality of alarm sensors in multiple locations on the handheld electronic devices (e.g., front and back, inside the battery compartment, etc.). These alarm sensors often hinder customer inspection of the device. In some cases, these alarm sensors installed within the handheld electronic devices can ignite when subjected to excessive heat within the devices.

Conventional techniques for tracking individual electronic devices are not scalable, and are not amenable to monitoring and managing thousands of devices scattered across hundreds of locations in a geographic area.

SUMMARY

An application based mobile device management system and method is presented herein. A mobile device management system and method. The mobile device includes a global positioning system (GPS) tracker for locating the mobile device. The method includes establishing a zone boundary defining a first zone and a second zone in a monitoring area using the GPS tracker, wherein the mobile device is maintained in a first operating mode when the mobile device is located in the first zone and a second operating mode when the mobile device is located in the second zone; sending one or more characteristics of the zone boundary to a management system; receiving at least one change to the one or more characteristics of the zone boundary from the management system; and upon the mobile device being located outside the first zone for longer than a predetermined time period, performing alert actions.

BRIEF DESCRIPTION OF THE SEVERAL VIEWS OF THE DRAWINGS

A more particular description of the invention briefly summarized above may be had by reference to the embodiments, some of which are illustrated in the accompanying drawings.

Thus, for further understanding of the nature and objects of the invention, references can be made to the following detailed description, read in connection with the drawings in which.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Figure 1A:
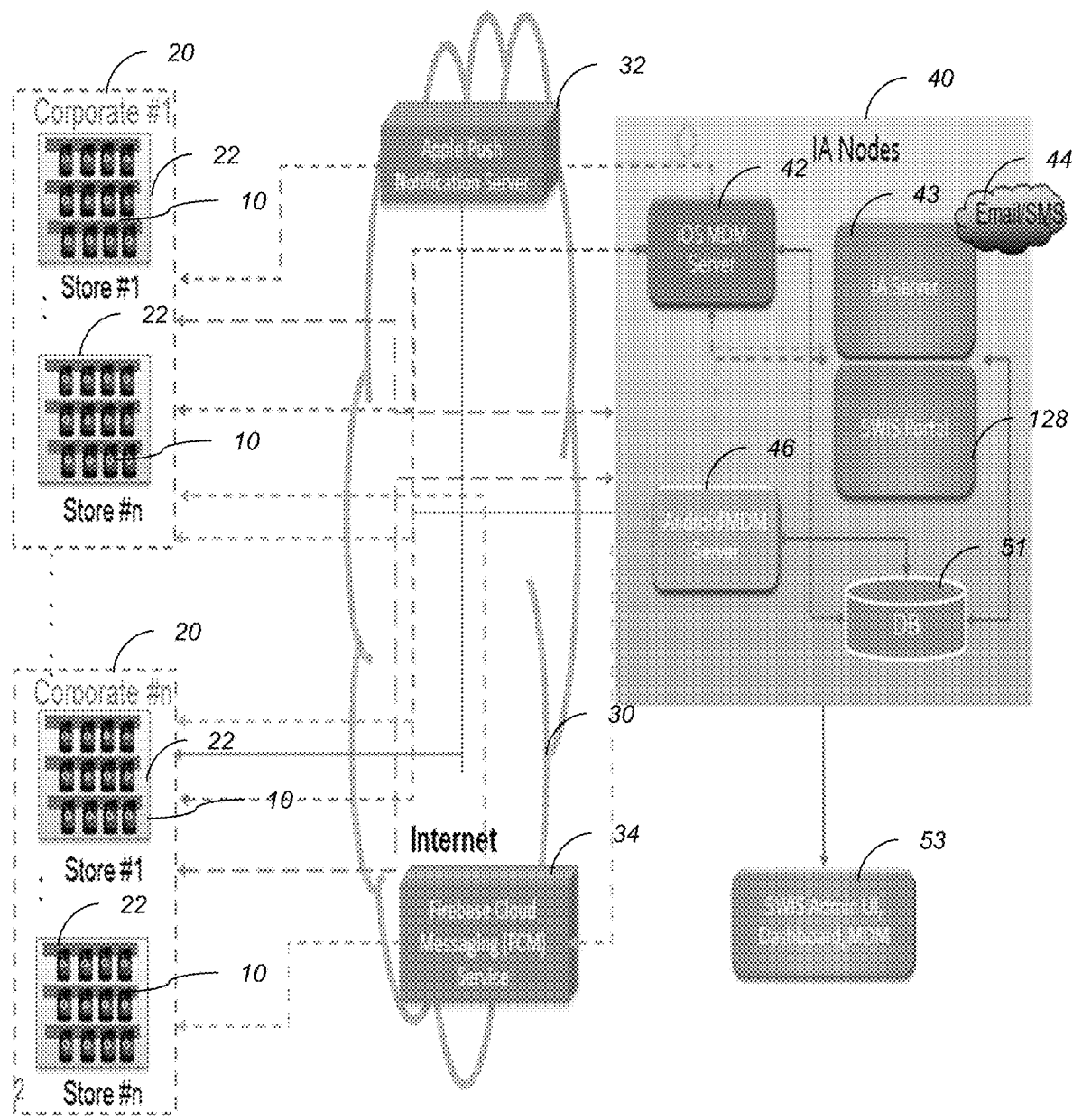
FIGS. 1A-1C are high-level diagrams showing the components of an embodiment of a system for managing mobile devices.
Figure 1B:
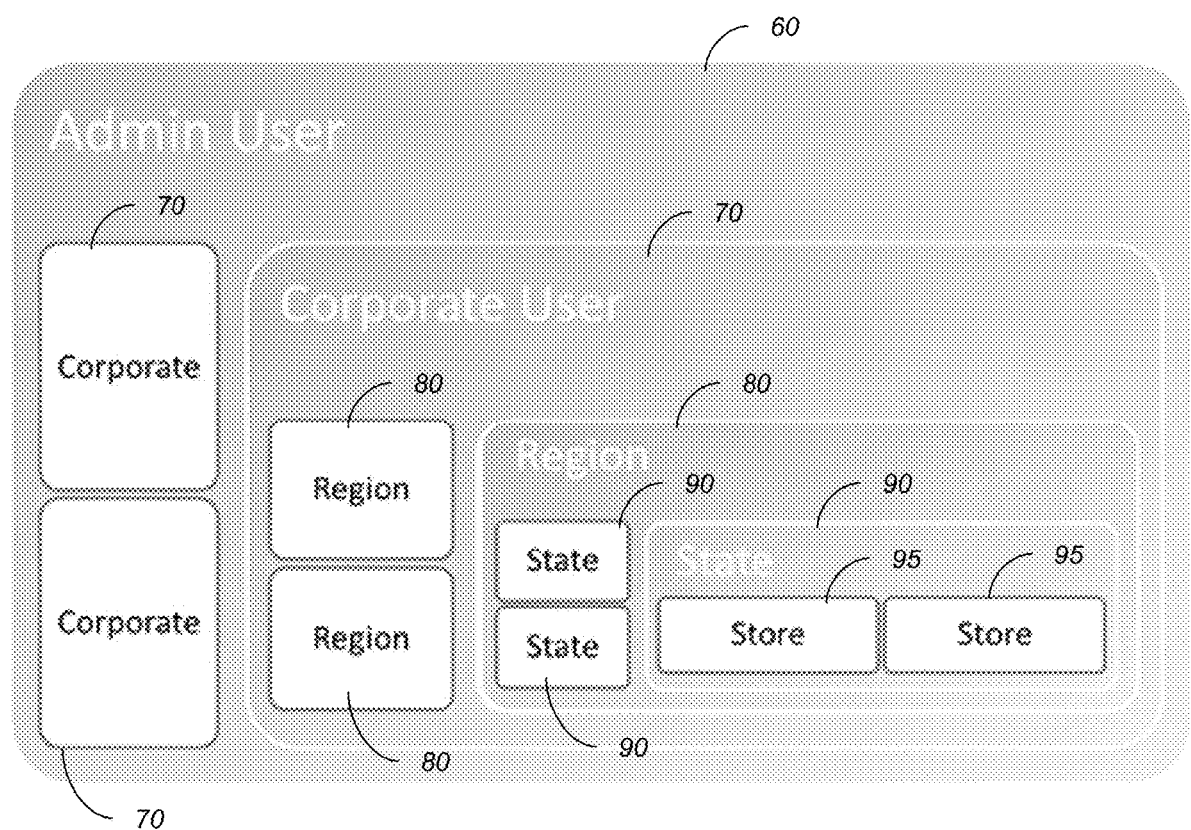

FIG. 1A is a high-level diagram of the end-to-end architecture of a mobile device security system. In the embodiment of FIG. 1A, the system generally includes corporate sites 20 having stores 22 which have numerous mobile devices 10 under management. The system connects via a network 30 with a push notification server 32, a cloud messaging service 34, and intelligent agent nodes 40. Each node 40 includes mobile device management servers 42, 46, an intelligent agent 43, an email/SMS capability 44, a system server 128, a database 51, and configuration user interface 53.

Turning next to the administrative multi-tenant user model of the server 128, the hierarchy of user accounts includes admin users 60, corporate users 70, regions 80, states 90, and stores 95.

Figure 1C:
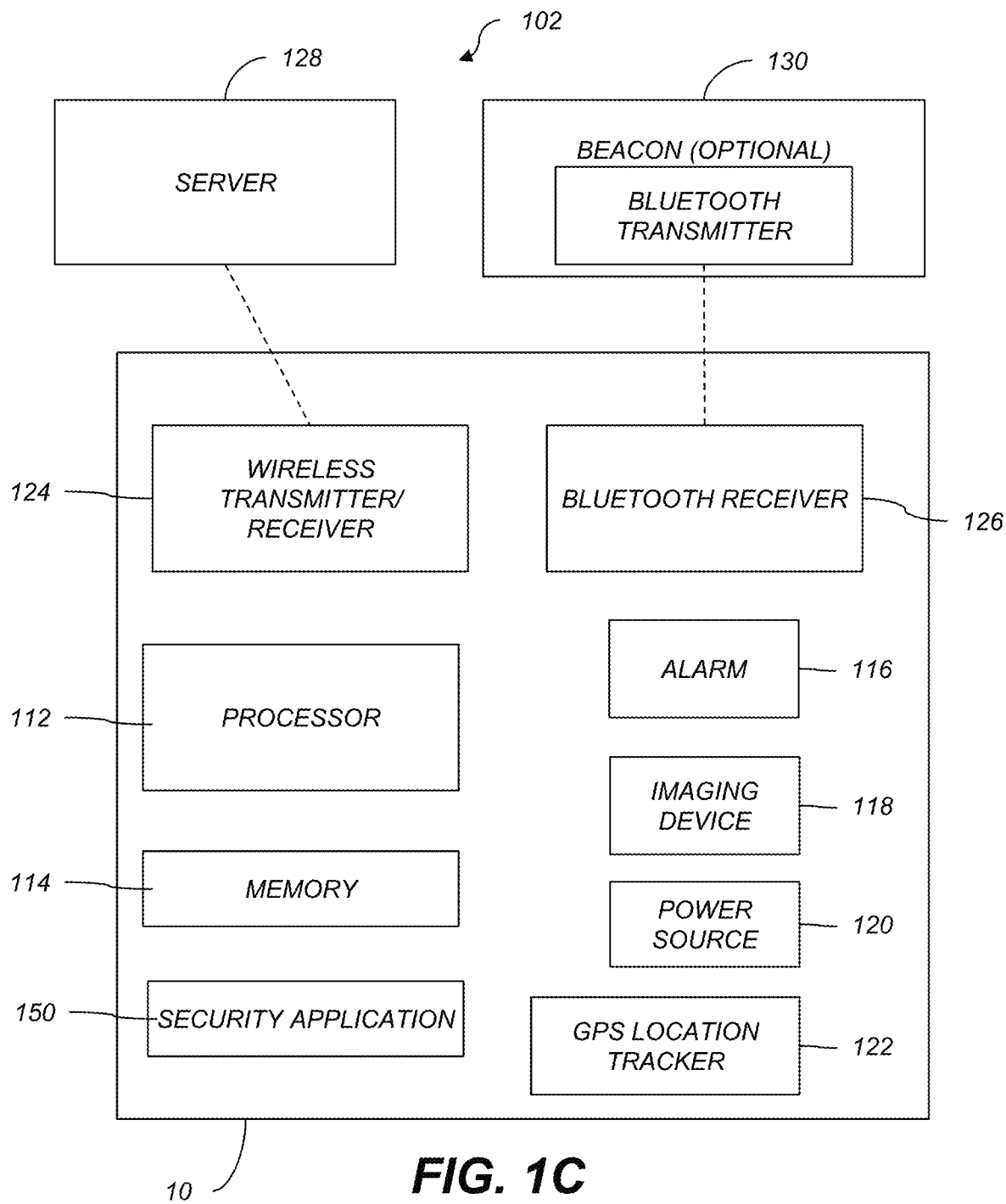

FIG. 1C is a high-level diagram of a mobile device security system 102. The system 102 includes a mobile device 10, such as a cellular phone or tablet, among others. While the system 102 is illustrated as including a single mobile device 10, it is to be understood that the security system 102 can include a plurality of mobile devices 10. In an embodiment, the mobile device 10 is a display model for a retail store. The mobile device 10 includes a processor 112 and memory 114. The memory 114 can be any suitable type of memory.

In addition, the mobile device 10 can include an imaging device 118. The imaging device 118 can be any suitable type of device including a still-shot camera, a video camera, or a combination thereof. The mobile device 10 can include a front-facing imaging device, a rear-facing imaging device, or a combination thereof.

The mobile device 10 includes a power source 120, such as a battery. For example, the power source 120 can be a lithium-ion battery. The power source 120 can be recharged via a charging cable coupled to an interface port (not shown) of the mobile device 10.

In addition, the mobile device 10 includes an alarm 116. The alarm 116 can be any suitable type of alarm. For example, the alarm can be an audible alarm, a visual alarm, or a combination thereof. In addition, the alarm 116 can be activated for a variety of reasons, as will be further discussed below. In an example, the alarm 116 can include different levels, such as different tones or different colors, depending on the reason the alarm 116 was activated. The alarm 116 can be activated when the mobile device 10 enters an alarm mode (also known as an alert mode). In addition, the alarm 16 can be activated when a charging cable is disconnected from the power source 120. In an example, when the alarm 116 is activated due to disconnection of the charging cable, the alarm can be deactivated by use of a password or passcode. In an embodiment, when the alarm 116 is deactivated by use of a passcode, only the sound is disabled, while the mobile device 10 is still monitored.

The mobile device 10 can include a location tracker 122. The location tracker 122 can be used to locate the mobile device 10. In an example, the location tracker 122 is a global positioning system (GPS) device. The location tracker 122 is used to establish a geographical radius, or geo-radius, about the device 10 for the purposes of maintaining security of the device 10.

The mobile device 10 further includes a wireless transmitter/receiver 124 and a Bluetooth receiver 126. In one embodiment, the wireless transmitter/receiver 124 can receive and transmit data via a WiFi connection or a cellular network. In another embodiment, the Bluetooth receiver 126 can both receive and transmit signals via a Bluetooth connection. In further embodiments, receiver 126 and wireless transmitter/receiver 124 may be a single radiofrequency subsystem, or may be a software based radio subsystem operating on the processor 112.

The system 102 may additionally include a server 128. In an embodiment, the server 128 is a security server. The server 128 receives data from the mobile device 10 via the wireless transmitter/receiver 124 or device data service. For example, the mobile device 10 can transmit the current device status, images, alarm data, and location information, among others, to the server 128. In addition, the mobile device 10 can transmit a record of people enabling the alarm 116 or disabling the alarm 116. For example, the mobile device 10 can transmit identifying information, such as a passcode or sign-in information, as well as image data to the server 128. The server 128 can maintain a record of when and who enabled or disabled the alarm 116. In an embodiment, the server 128 can correlate data records with image records. In addition, the server 128 can maintain a record of the cause of each alarm activation.

The server 128 can monitor the mobile device 10. For example, the mobile device 10 can send regular signals to the server 128. When a signal is not received in the server 128, the server 128 can send a signal or ping the mobile device 10 to test responsiveness of the mobile device 10. If the mobile device 10 does not response, the server 128 can create an alarm or notification.

The system 102 further includes an optional beacon 130 having a Bluetooth transmitter 132. In another embodiment, the beacon 130 is any radiofrequency transceiver, including near field communications, WiFi, cellular communication, etc. The beacon 130 sends a signal, via the Bluetooth transmitter 132, to the Bluetooth receiver 126 of the mobile device 10. In another embodiment, the receiver 126 is any radiofrequency transceiver, including near field communications, WiFi, cellular communication, etc. The beacon 130 can be placed in a fixed location and, in an embodiment, when the signal is not received in the Bluetooth receiver 126, such as when the mobile device 10 is beyond the range of the Bluetooth transmitter 132, the alarm 116 can be activated. In another embodiment, the alarm 116 can be activated when the mobile device 10 is moved into range of the Bluetooth transmitter 132 and a Bluetooth signal is received by the Bluetooth receiver 126. In another embodiment, the beacon 130 can push notifications to the mobile device 10, such as advertisements, via the Bluetooth transmitter 132.

While the optional beacon 130 is described above as having a Bluetooth transmitter 132, the transmitter 132 can transmit any suitable type of wireless signal, such as a WiFi signal or radio frequency signal. In addition, while the beacon 130 is described as a discrete device, it is to be understood that the functionality of the beacon 130 can be included in existing devices. For example, the beacon 130 can be a wireless router that transmits a wireless or RF signal in addition to the typical operation of a wireless router. Similarly, the Bluetooth receiver 126 of the mobile device 10 can be configured to receive any suitable type of signal in accordance with the signal transmitted by the transmitter 132 of the beacon 130.

The beacon 130 includes a power source (not shown), such as a battery. In an embodiment, the battery has an average life of five (5) years. In an embodiment, the battery life of the beacon can be monitored to ensure timely replacement of the beacon battery. In the figures to follow, different instances of the beacon 130 are labeled as the letter B followed by a number, for ease of understanding.

As explained below, the system 102 can manage mobile device security in several different modes of operation. For example, the system 102 can make use solely of GPS location trackers 122 of one or more mobile devices 10 to keep track of multiple mobile devices 10. In another example, the system 102 can make use of a combination of the GPS location trackers 122 of one or more mobile devices 10 as well as one or more beacons 130 for mobile device security. In a further example, the system 102 can make use of just the beacons 130 to manage security of one or more mobile devices 10. For ease of discussion, these modes of operation will generally be referred to as GPS mode, combination GPS and beacon mode, and beacon mode.

Note that in a large scale deployment, a retailer operating multiple stores may use a combination of these modes. For instance, a retailer could have three types of point of sales locations, such as dedicated stores, kiosks (e.g., in a mall or airport), and multi-level stores. In the dedicated stores, the retailer may choose to operate the security system in GPS mode, because it can allow for a simpler deployment. In such a case, each mobile device 10 will be set up as explained below to have a geo-radius safe zone which corresponds to the footprint of the store. In kiosks, the retailer may choose to operate the security system in beacon mode, because the sales kiosk may be a relatively small size and a beacon can be used to establish a more rigidly defined safe zone around the kiosk. In a multi-level store, a combination GPS and beacon mode may be deployed for mobile device security, to allow for resolution of the location of a mobile device on a first floor versus a second floor located directly above, or to track a mobile device when crossing a specific threshold such as leaving the floor or the front door of the store. Of course, various combinations of these deployment models may be employed in a given situation and are contemplated as within the scope of the present disclosure.

For example, application 150 may be a client for iOS or Android platforms. The application may perform the zone related actions described above, and at the same time may send a periodic heartbeat to the server so that the server can alarm if the device 10 stops sending the heartbeat, e.g., if the device is stolen or put into a Faraday cage.

In one embodiment, communication between the application 150 and the server is via a REST application programming interface (API).

The server 128 may include a web user interface for administration. The server 128 may include an alert framework for local and email alerts, as well as SMS alerts. The server 128 may include an interactive dashboard to view and manage devices, stores & users. For example server 128 may display a live view of all devices 10 on a map and visual display of Safe/Lost status. This display, in one embodiment, includes automated captured image upload on alarm and Admin UI to for browsing by an administrator. Further displayed by the server is inventory tracking (indoor beacon location and installation date) and management of beacons. In embodiments that use beacons, beacon installation and in store/location beacon details like location, specific notes, installation time are input and uploaded to server via application 150.

In another example, the server 128 includes WiFi/Bluetooth safety check allows the system to alert if the radio interfaces are no longer available. The server 128 may also include remote ping of individual devices 10, and manual override to cancel alarm states.

Upon entering an alarm state due to exit from a safe zone, in one example, the application 150 will alert the server 129. In such a case, the server 128 can upload and install a specific profile remotely on the device 10. For example, a kiosk profile can be installed. In another example, the home and volume buttons can be locked out. In a further example, the application 150 can receive a message to wipe the device 10 from a mobile device management server.

The server 128 can differentiate between alarm causes (e.g. Beacon loss, Charger Loss, Heartbeat Lost). The administrative user interface of the server 128 can report device status (e.g. Warning, Armed, Disarmed etc.) and heartbeat statuses. The application 150, in response to an alarm condition, can capture camera images and upload to server any time device is disarmed or deactivated or password entered locally. The application 150 can automatically cancel alarms as soon as device 10 is moved into a safe zone. With respect to the heartbeat feature, the server 128 can alert reporting if heartbeat from device is lost for more than a specific pre-configured time period. Similarly, the server 128 can automatically trigger a ping to a device if no device Heartbeat received in a configurable time. The heartbeat can be correlated with battery levels to determine if a device has lost power. The server 128 can also log and manage passwords of each device, mark devices as recovered/cancel alarms on server, and control screen saver timeouts for the devices.

In order to suppress false alarms, the server 128 can queue alerts for a period of time to give the devices time to return to safe zones. The application 150 can trigger the alarm based on a combination of one or more conditions, including zone exit or entry, movement and velocity, and charging status of the device. The application 150 can disable any critical functions on the phone, such as power off or factory reset, to prevent unauthorized configuration.

With respect to geo-radius based features, as noted above the system can be operated in a GPS mode only. In such a case, the geo-radius and other characteristics (e.g., shape and size of zones) can be updated from the server 128 to each device 10 via application 150.

In addition, a configurator program may be used to install the application 150 on the devices 10. For example, the configurator can supervise so-called "retail operating system" versions of device 10 system software, to allow demonstration mode programming to continue to be available on the devices.

In one example, the configurator operates by starting with a "retail operating system" loaded device 10. First, a full backup of the device 10 is performed. The full backup includes a backup of "retail operating system" contents and settings. Next, the device 10 is updated to the latest commercial firmware that allows a supervision process to be installed. Subsequently, the application 150 is loaded onto device 10, e.g., via a golden image that is loaded onto device 10. Then, the application 150 is launched and the device 10 is enrolled and registered with a server, a geo-radius zone is established, etc. Once the device 10 has been configured with the application 150, the device is restored with the "retail operating system" version that had been previously backed up, so that the device will continue to offer demonstration modes for customers.

In one or more embodiments, application 150 includes certain additional parameters (Speed, Tilt, Heading, Position Error) in the Heartbeat message periodically sent to the server 128. With respect to the messages sent from application 150 to server 128, in order to overcome certain restrictions imposed by the mobile device operating system, the application 150 performs certain additional steps when using cellular connectivity or operating on low battery. In one embodiment, application 150 establishes a secure tunnel to send heartbeat and other status messages to the server 128. In such a case, the application 150 can send to the server 128 periodic device status including location, speed, position error, battery status, app status (safe or in alarm state). Once in an alarm condition, the application 150 can switch from, e.g., every 2 minutes to every 5 seconds. The application 150 can switch between different messaging mechanisms based on the background or foreground status of the application 150. For example, the application 150 can use direct HTTP(s) API calls to server 128 when in foreground and use HTTP(s) API call over a secure tunnel (as described above) when in background. In addition, while running in background, application 150 can also a have a fall back mechanism for Heartbeat retry to send the Heartbeat message via direct HTTP(s) API call to server in case secure tunnel establishment fails for any reason in any attempt.

In another example, the server 128 monitors heartbeats of devices 10 in real time and wakes up the application 150, e.g., by using a mobile device management enable Kiosk command if no heartbeat received in last time period (e.g., 5 minutes) configurable at server 128. Both the server 128 and the application 150 can automatically disable Kiosk mode with in short time period to ensure that application 150 is not locked to screen moves to the background in a timely manner to avoid any user experience issues.

Other alerting actions can include making a black screen upon alarm, and performing a keep alive check. Additional alerting actions include disallowing WiFi, Bluetooth settings, cellular communication. In addition, application 150 can detect permission changes and perform an alert action based on the permission changes and/or zone status information.

Figure 2A:
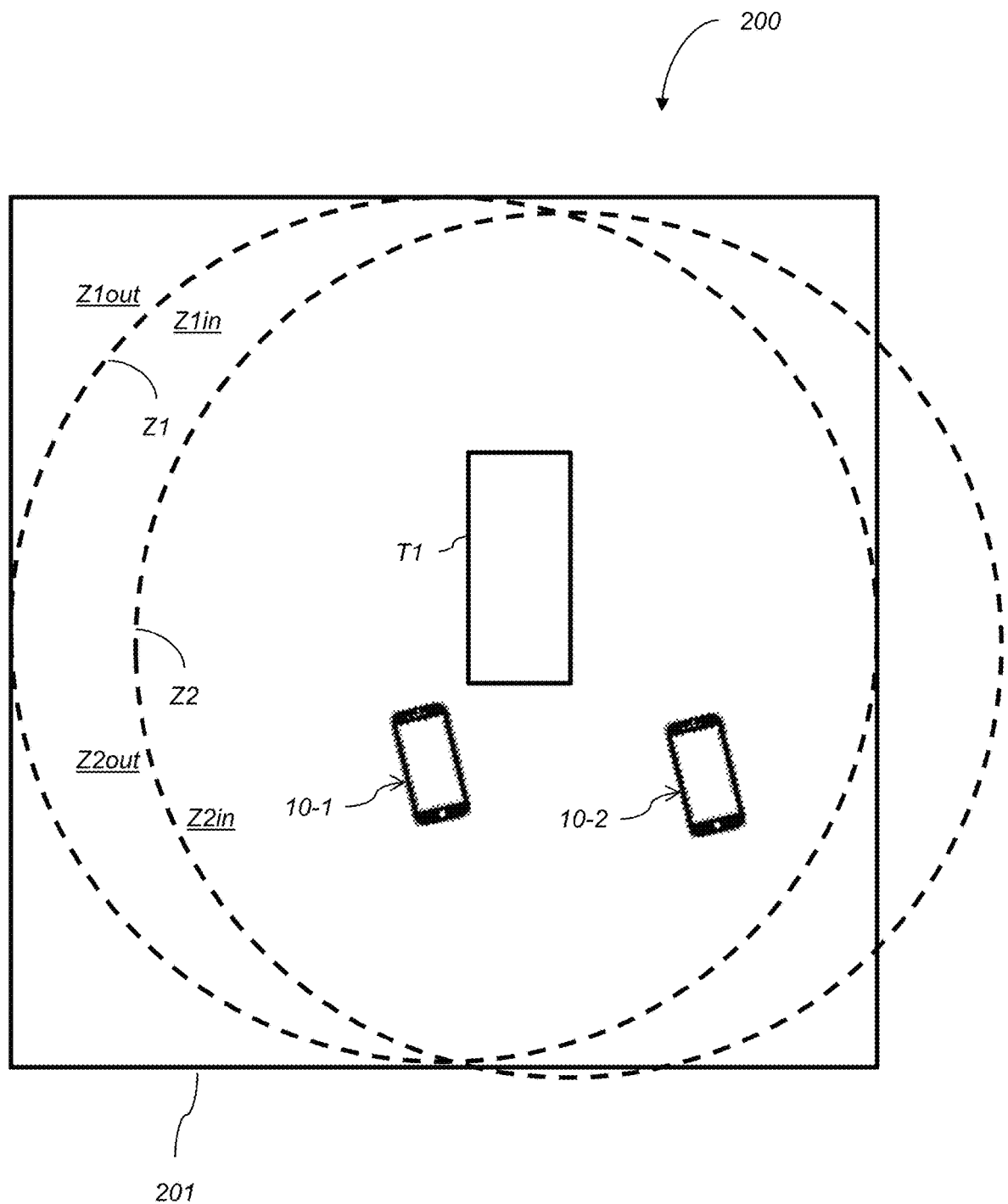
FIGS. 2A-2C depict GPS mode monitoring of multiple mobile devices of FIG. 1C, in accordance with one or more aspects set forth herein.
Figure 2B:
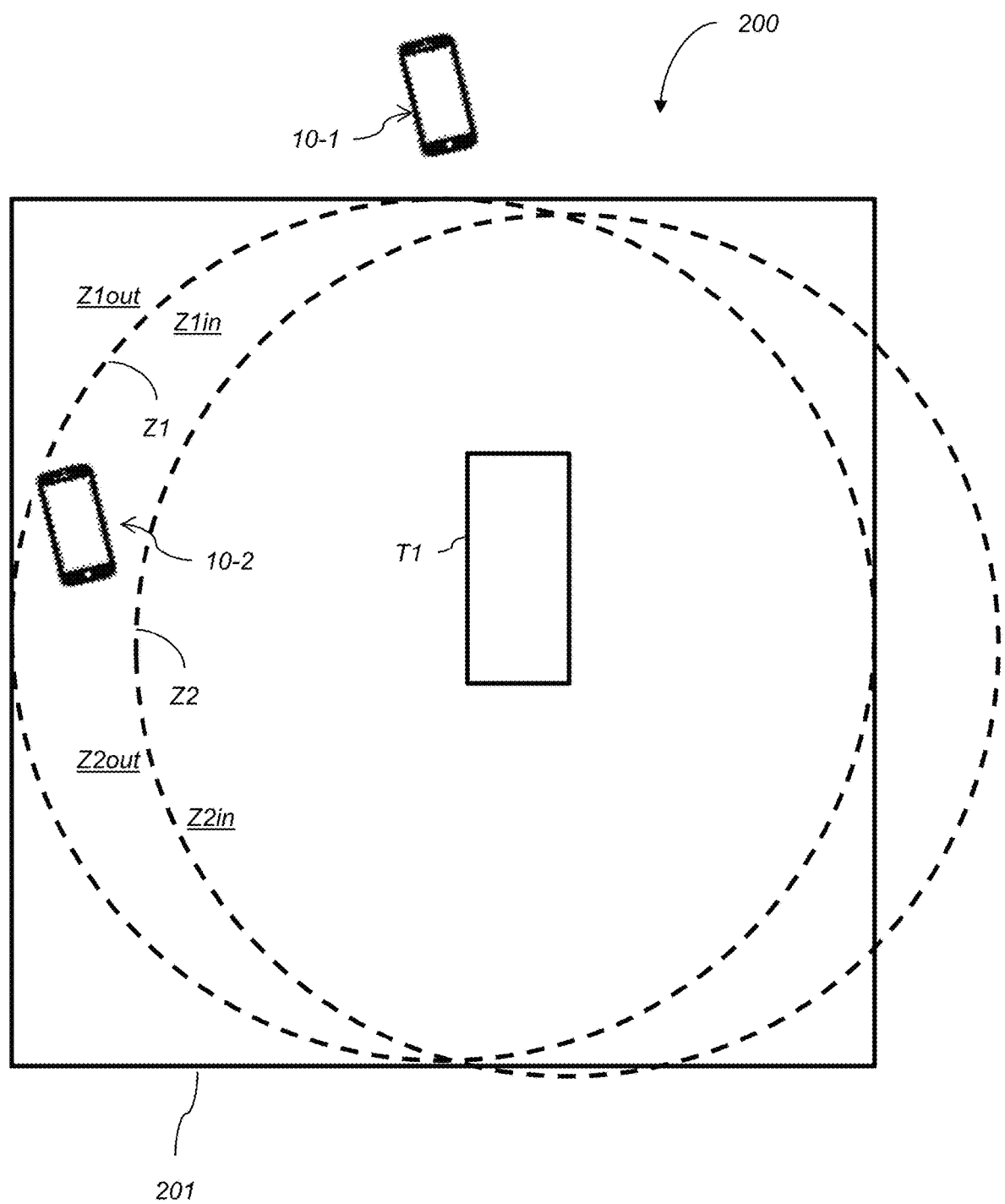
Figure 2C:
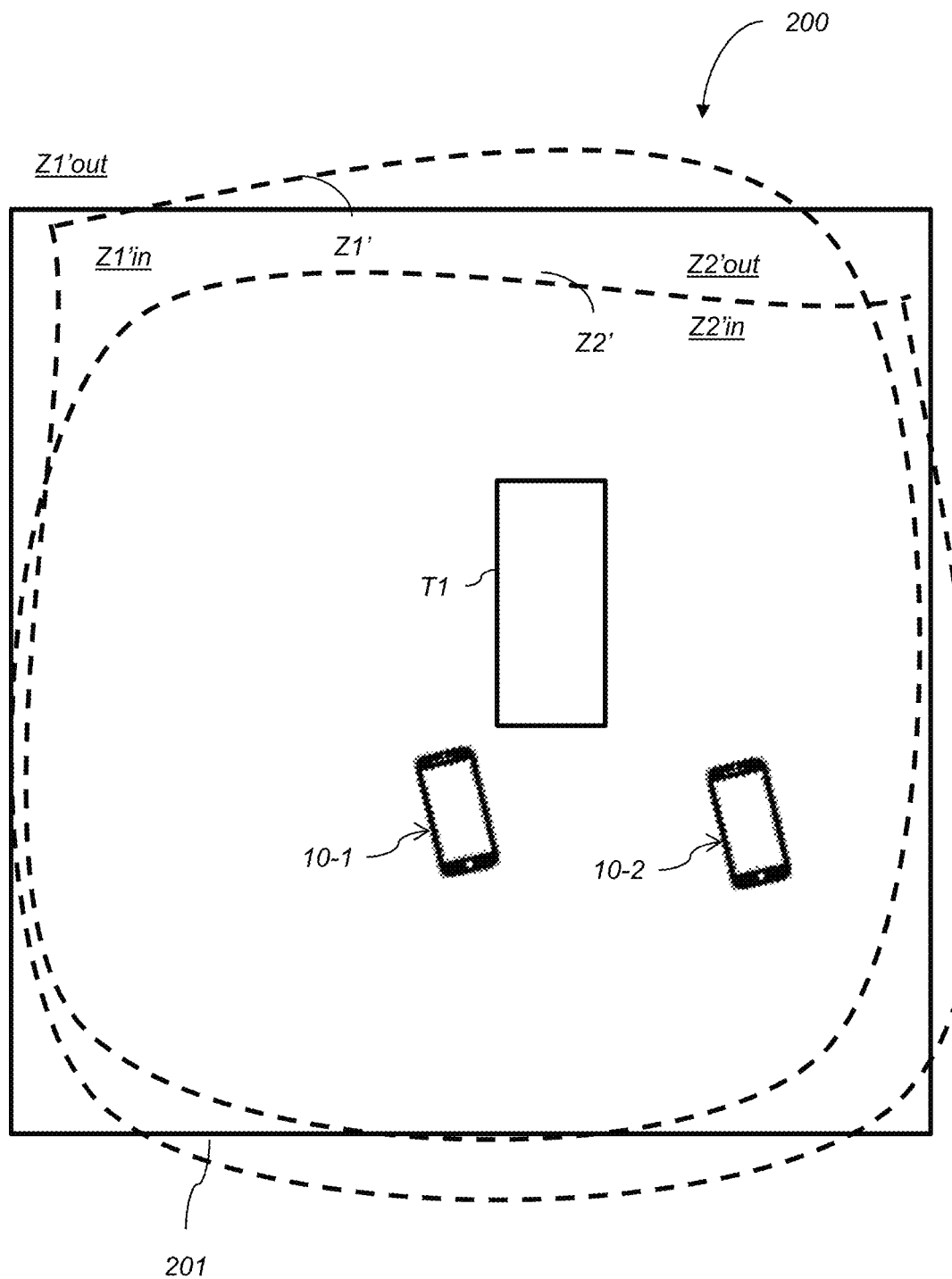

FIG. 2 is an illustration of a monitoring area 200. By way of example, the monitoring area 200 may represent a retail store, a stock trading floor, a library, a secured facility, a business enterprise, or any other location in which monitoring of mobile devices is desired. Although the monitoring area 300 may represent a variety of different usage models, in order to provide clarity, the examples set forth below will be stated from the point of view of a retail store, and it will be understood that such a description for clarity only will not limit the scope of the disclosure.

Continuing with the embodiment of FIG. 2, the monitoring area 200 includes the perimeter of a building 201, which has in this example one table T1, which may be used to display different models of mobile devices, such as a plurality of mobile devices, including two specific devices 10-1, 10-2 as described in detail in FIG. 1C. In the retail store example, different brands or different models of devices from the same brand may be placed on the table T1 for consumer interaction. In the library example, tables may be used to hold devices, such as eBook readers, for reading about different topics.

Advantageously, the techniques described herein allow consumer interaction with the devices 10-1, 10-2, without requiring a tether or attached monitoring component. Instead, as explained in further detail below, each of the devices 10-1, 10-2 includes an application 150 (commonly referred to as an "app") which provides mobile device management, including security monitoring. Each of the devices 10-1, 10-2 includes a GPS location tracker 122 (see FIG. 1C).

When application 150 is installed on device 10-1, a zone boundary Z1 is established as a geo-radius about the GPS location as determined via GPS location tracker 122 of 10-1. For example, a user setting up application 150 can be standing at table T1, and can set up the zone boundary Z1 as a geo-radius with a specific size. The establishment of zone boundary Z1 in turn establishes two zones, zone Z1in, at or inside the zone boundary Z1, and zone Z1out, outside the zone boundary Z1.

Similarly, the user can install an application 150 on device 10-2 to establish a zone boundary Z2 as a geo-radius about the GPS location as determined via the GPS location tracker 122 of device 10-2. The establishment of zone boundary Z2 in turn establishes two zones, zone Z2in, at or inside the zone boundary Z2, and zone Z2out, outside the zone boundary Z2.

Note that in the embodiment of FIG. 2, the zone boundaries Z1, Z2 are offset from one another. This offset can occur due to changes in the exact location that the user is standing when setting up the devices 10-1, 10-2, and has been exaggerated in FIG. 3 in order to show the difference. The present disclosure advantageously allows for the zone boundaries to be synchronized among multiple devices 10-1, 10-2, in a monitoring area for consistency. Such synchronization may be accomplished as follows. Each mobile device 10-1, 10-2 sends its configuration to the server 128. The server 128 then can fine tune various characteristics of the zone boundaries Z1, Z2, and send those fine-tuned configurations back to devices 10-1, 10-2 for implementation. For example, the server 128 can average the zone boundaries of multiple devices to create a single zone boundary for all the devices to follow. In another example, the server could command each mobile device 10-1, 10-2 to increase or decrease the zone boundaries in order to relax or tighten the zone definitions in response to various conditions. For example, zones can be contracted at a time when users are expected to start returning devices to a central location, e.g., at closing time of a library or store. In these examples, the system of the present disclosure offers the significant benefit of allowing each device to be set up independently but still allow centralized management as needed, which provides the best of both centralized and independent configuration approaches.

Thus, the system allows for multiple zone boundaries Z1-Z2, which may be overlapping or non-overlapping, to be established using GPS location trackers 122 of respective devices 10-1, 10-2. Indeed, tens or hundreds of devices could be located in monitoring area 200, each of which is running application 150 to manage mobile security by establishing corresponding zone boundaries. The devices 10-1, 10-2, which are running the monitoring application 150, continue to receive GPS location information from their corresponding GPS location trackers 122 as they move about the monitoring area 200. The monitoring application 150 of the mobile device 10 may optionally communicate with server 128 as desired, or may allow for a self-contained monitoring system without a server. Each deployment alternative has advantages, with a server-based model including the ability to have a centralized point from which to inventory and monitor all mobile devices, and the client-only device model including the simplicity of deployment afforded by a serverless installation.

As depicted in FIG. 2B, the devices 10-1, 10-2 may follow paths through the monitoring area, for example when picked up and used by a consumer in the retail store example. In such a case, the device 10-1 initially is present in zone Z1in as depicted in FIG. 2A, but then is later present in zone Z1out. Similarly, device 10-2 initially is present in zone Z2in as depicted in FIG. 2A, but then is later present in zone Z2out.

As the devices 10-1, 10-2 move within the monitoring area 200, the devices 10-1, 10-2 continues to receive GPS signals, and by comparing with the zone boundaries, may determine entry and/or exit of zones, and may perform zone-specific entry and/or exit functionality, as described in detail with respect to FIGS. 5A-5B, below.

Although the zone boundaries Z1, Z2 are depicted as circles, these zones may be of any conceivable shape, as depicted in FIG. 3C. In such a case, the zone boundary cannot be described simply as a circle with a radius, but can nonetheless be defined mathematically to cover a specific area.

Figure 3:
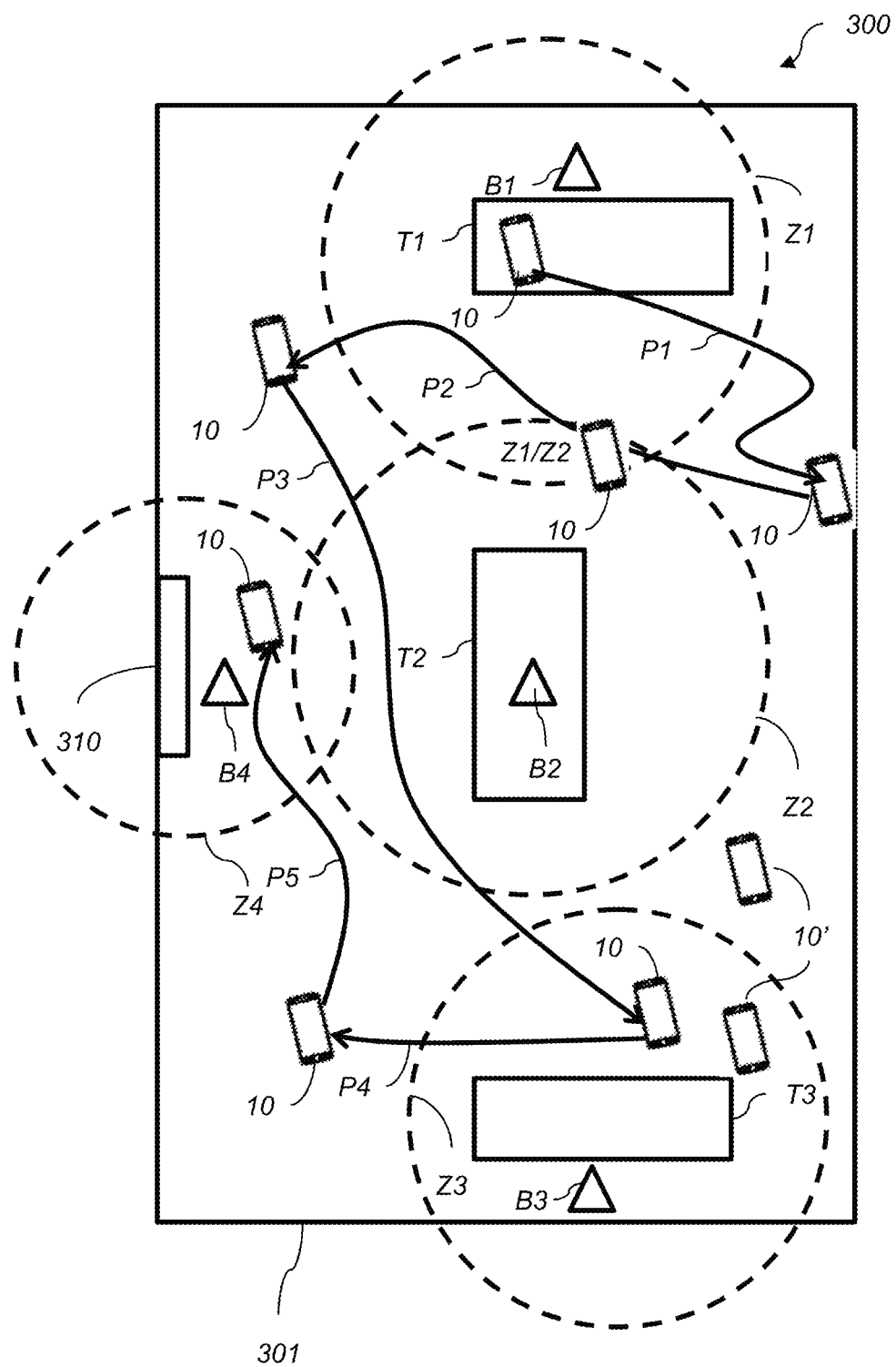
FIG. 3 is depict beacon mode monitoring of multiple mobile devices of FIG. 1C, in accordance with one or more aspects set forth herein.

FIG. 3 is an illustration of another monitoring area 300. The monitoring area 300 includes a single exit 310 for either entering of exiting the monitoring area 300. By way of example, the monitoring area 300 may represent a retail store, a stock trading floor, a library, a secured facility, a business enterprise, or any other location in which monitoring of mobile devices is desired. Although the monitoring area 200 may represent a variety of different usage models, in order to provide clarity, the examples set forth below will be stated from the point of view of a retail store, and it will be understood that such a description for clarity only will not limit the scope of the disclosure.

Continuing with the embodiment of FIG. 3, the monitoring area 300 includes three tables T1-T3, which may be used to display different models of mobile devices, such as a plurality of devices 10', including one specific device 10 as described in detail in FIG. 1C. In the retail store example, different brands or different models of devices from the same brand may be placed on the tables T1-T3 for consumer interaction. In the library example, the tables may be used to hold devices, such as eBook readers, for reading about different topics.

Advantageously, the techniques described herein allow consumer interaction with the devices 10, 10', without requiring a tether or attached monitoring component. Instead, as explained in further detail with respect to FIG. 5A, each of the devices 10, 10' includes an application 150 (commonly referred to as an "app") which provides mobile device management, including security monitoring. Each of the devices 10, 10' includes a radiofrequency receiver, such as a Bluetooth receiver 126 (see FIG. 1C).

Adjacently disposed to the tables T1-T3 are beacons B1-B3, respectively. Each of the beacons B1-B3 include wireless transmission capabilities for sending a signal that is present within a corresponding zone Z1-Z3, respectively. In addition, the exit 210 also includes an adjacently disposed beacon B4, which establishes a corresponding zone Z4. Signals from the beacons B1-B4 may be received and processed by the devices 10, 10'.

The beacons B1-B4 may be Bluetooth low energy beacons, such as Estimote beacons, including Estimote location beacons or Estimote proximity beacons, available from Estimote, Inc., of New York, N.Y. In another example, the beacons B1-B4 may be purpose-built beacons that include any suitable radiofrequency technology, such as WiFi, CDMA, etc., for sending a configurable signal that can define a zone, either through signal strength, data information, etc. The beacons B1-B4 send a specific signal that has a specific signal strength, and based on either the signal itself, the signal strength, the presence of a signal, or the lack of a detectable signal, or a combination of any of these factors, the zones Z1-Z4 may be established. In yet another example, the beacon itself may include multiple beam forming antennas that are programmable to create a non-symmetric zone. In addition, the actual zone created may be dependent on the presence of walls and materials within the monitoring area 300.

In operation, the beacons B1-B4 are deployed near the tables T1-T3 and the exit 310, respectively. In one example, an individual beacon, such as the beacon B2 may be deployed on the table T2 to establish the zone Z2 that includes the table T2 and surrounding floor space within the monitoring area 300. In another example, the beacon, such as the beacon B4 may be deployed in or near the ceiling of the building that houses the monitoring area 300, and more specifically in the ceiling above the area of the exit 310, to establish the zone Z4. In other examples, a specific beacon may be deployed inside a hidden ceiling or wall panel, inside a display case, in a locked office or closet, etc. Beacon deployment tools, such as beacon receiving software operational on a mobile device such as the devices 10, 10' can be used to show the signal strength of a beacon as an installer walks around the monitoring area 300.

Although the zones Z1-Z4 are depicted as circles, these zones may be of any conceivable shape, as noted above, due either to intrinsic characteristics of the monitoring area, such as walls and ceilings, etc., or due to configuration of the beacons to enable beam forming antennas, etc.

Thus, the monitoring area 300 allows for multiple zones Z1-Z4, which may be overlapping or non-overlapping, to be established using the beacons B1-B4. The device 10, which has been configured with a monitoring application 150, then receives the beacon signals from the beacons B1-B4 as the device 10 moves about the monitoring area 300. The beacon signals may be received using the radiofrequency transceiver, such as the Bluetooth receiver 126 (FIG. 1C) of the device 10. The monitoring application 150 of the mobile device 10 may optionally communicate with a server if desired, or may allow for a self-contained monitoring system without a server. Each deployment alternative has advantages, with a server-based model including the ability to have a centralized point from which to inventory and monitor all mobile devices, and the client-only device model including the simplicity of deployment afforded by a serverless installation.

As depicted in FIG. 3, the device 10 may follow a path through the monitoring area, for example when picked up and used by a consumer in the retail store example. In such a case, in the illustrated example, the device 10 initially is present on the table T1 Next, the device 10 follows the path P1 to a location that is not within any of the zones Z1-Z4. Next, the device 10 follows the path P2 to a location that is within both Z1 and Z2, then to through zone Z1, and to a location that is not within any of the zones Z1-Z4. Next, the device 10 follows the path P3 through zone Z2 and into zone Z3. Next the device 10 follows the path P4 from the zone Z3 to a location that is not within any of the zones Z1-Z4, ending up in the zone Z4, near the exit 310.

As the device 10 traverses the paths P1-P5 within the monitoring area 300, the device 10 continues to receive signals from the beacons B1-B5. Upon receiving the signals from the beacons B1-B5, the device 10 may determine entry and/or exit of zones, and may perform zone-specific entry and/or exit functionality, as described in detail with respect to FIGS. 5A-5B, below.

Figure 4:
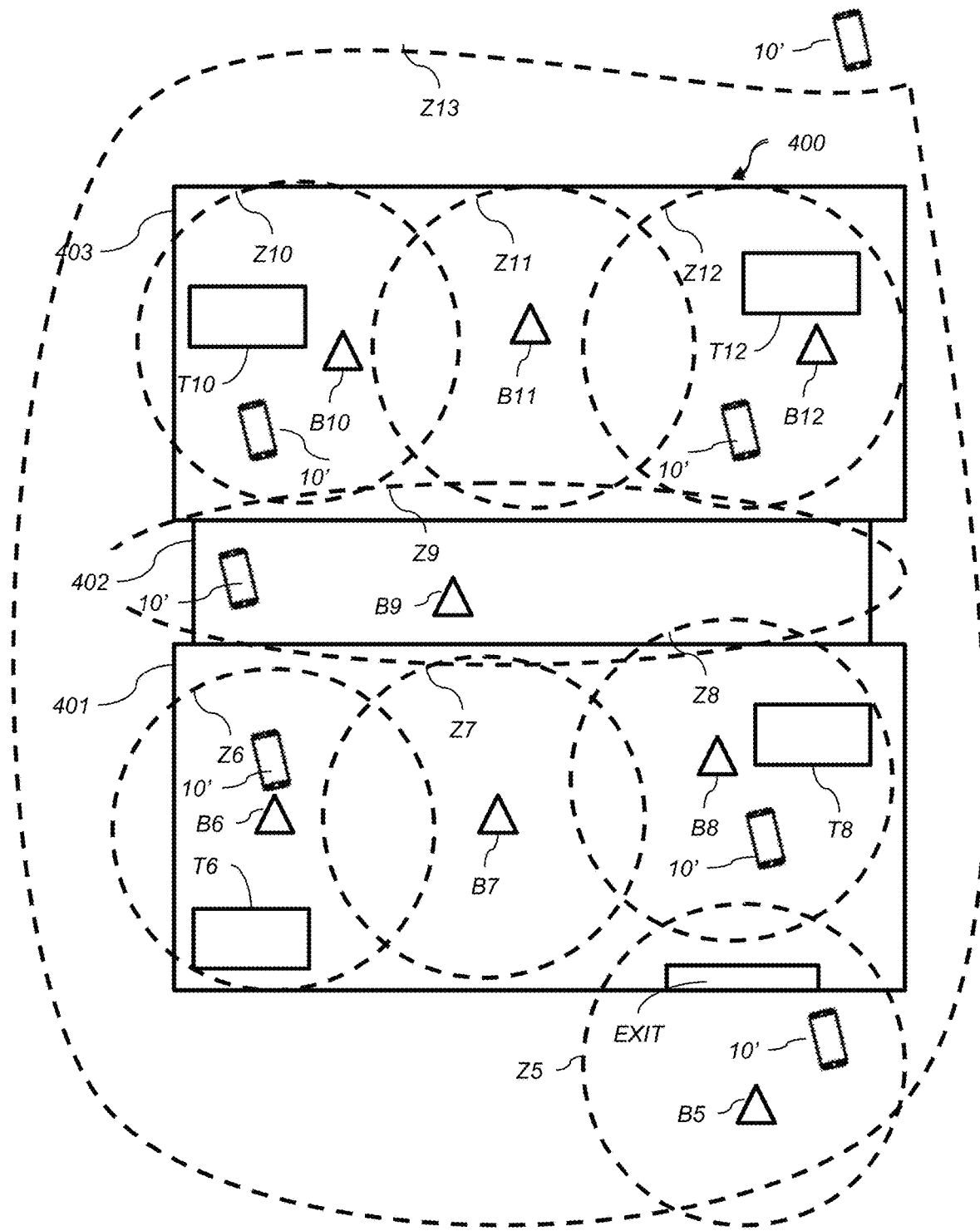
FIG. 4 depict combined GPS and beacon mode monitoring of multiple mobile devices of FIG. 1C within a multi-floor building, in accordance with one or more aspects set forth herein.

As depicted in FIG. 4, the monitoring area 400 includes a first-floor monitoring area 401, a stairwell monitoring area 402 and a second-floor monitoring area 403. Deployed within the monitoring area 400 are eight beacons B5-B12 which are used to establish zones Z5-Z12 in a manner similar to that described above with respect to FIG. 2. In addition, application 150 sets up a geo-radius based zone Z13 using the GPS location tracker 122 of the device 10'. Continuing with the example of FIG. 4, six different mobile devices 10' are depicted in five zones Z5, Z6, Z8, Z10 and Z12, and in the stairwell monitoring area 302 outside of any of zones Z5-Z12. Further, the monitoring area 300 includes four tables T6, T8, T10 and T12. In addition, if the mobile device 10' leaves zone Z13, the alerting actions can be activated based on leaving the GPS established zone. As shown in the example deployment of FIG. 3, the monitoring system may include numerous beacons, such as the beacons B5, B7, B9 and B11 (i.e., in the odd numbered zones) which are not affiliated with a table. Thus, the technique described herein does not rely on a one-to-one correspondence of elements, and specifically tailored systems may be made with an infinite number of variations, all of which are within the scope of the present disclosure.

Figure 5A:
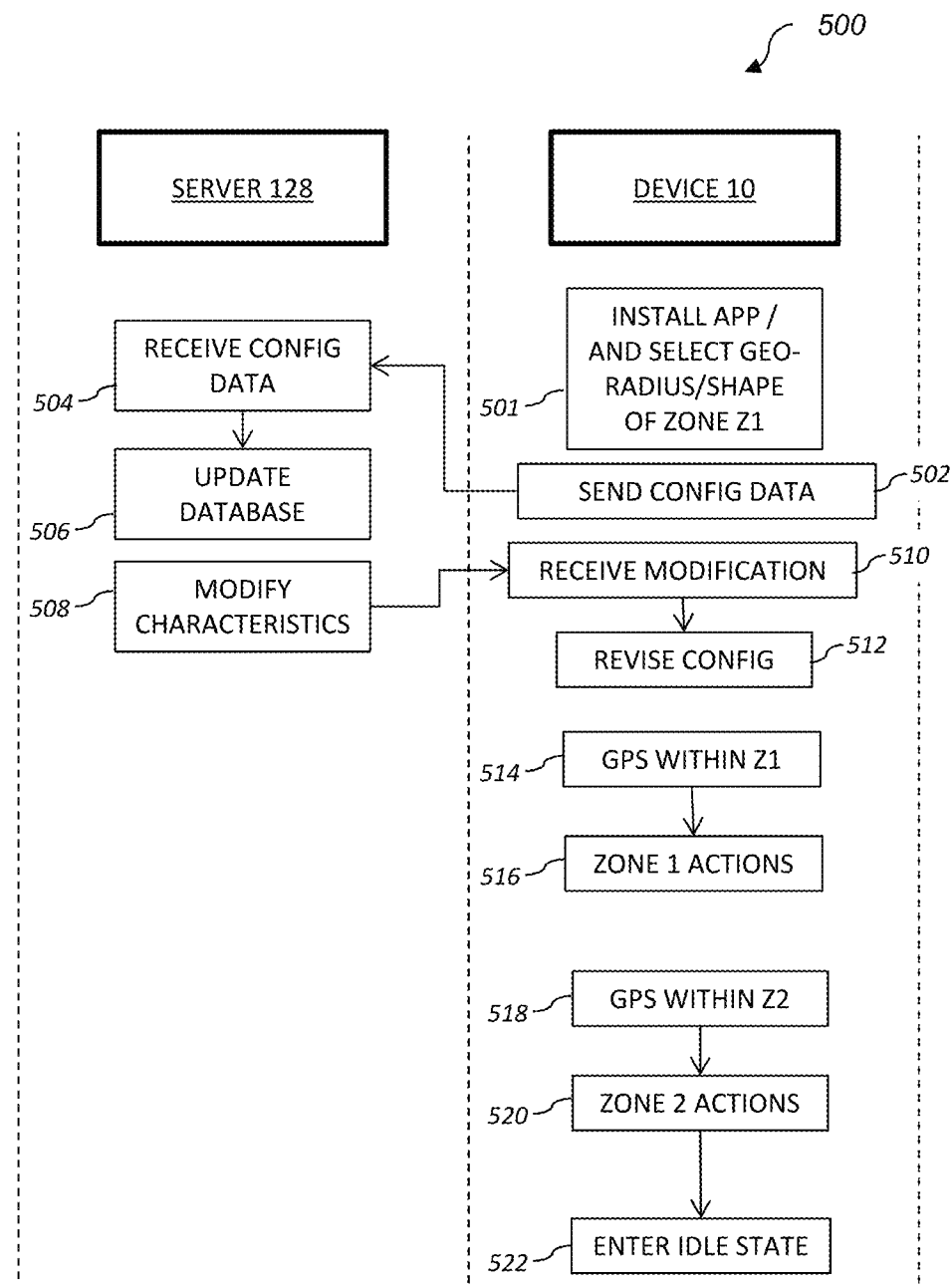
FIGS. 5A-5B are flow diagrams of a method of providing security to a mobile device, in accordance with one or more aspects set forth herein.
Figure 5B:
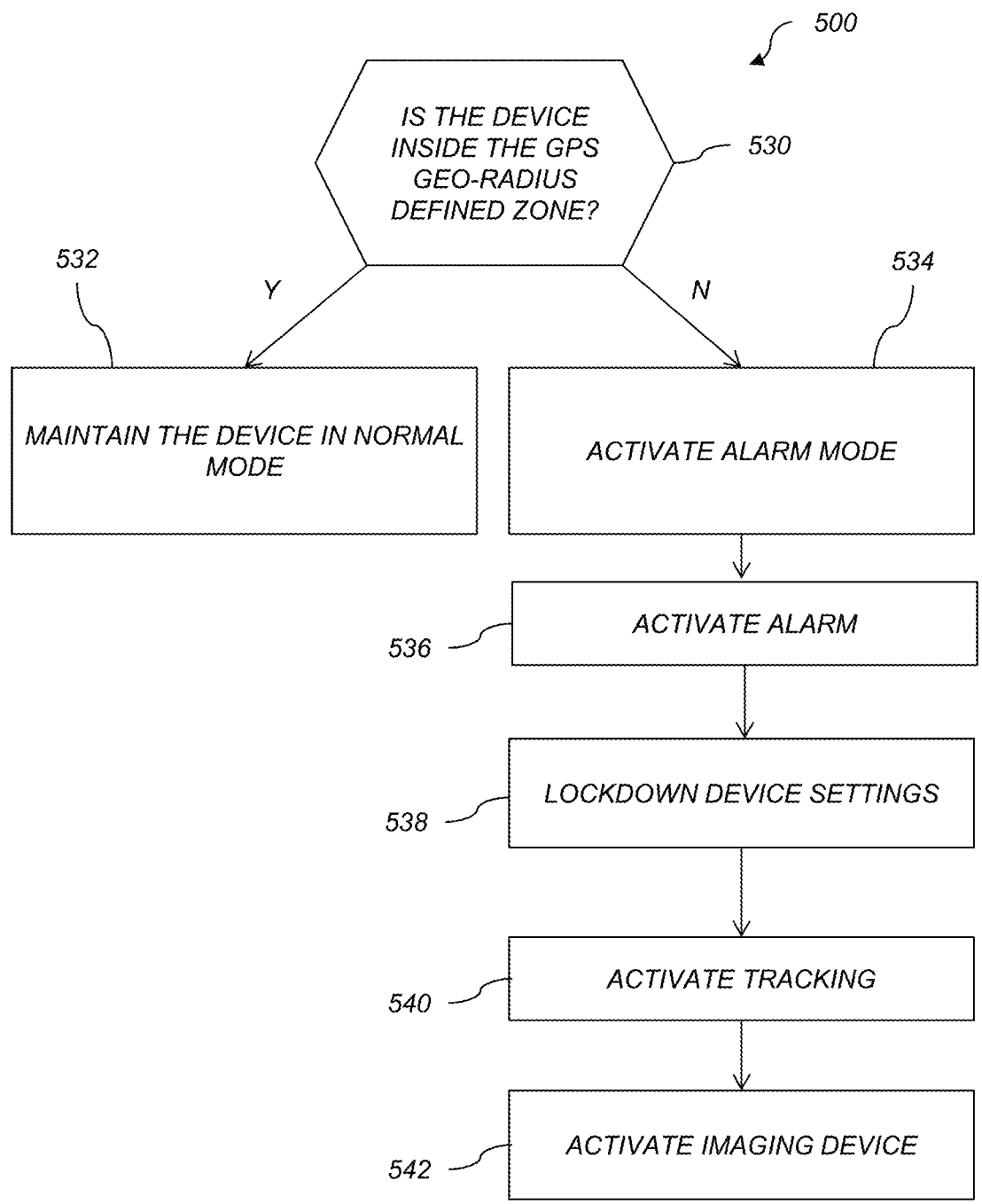

Next, to illustrate the system and method set forth herein, FIGS. 5A-5B set forth detailed flow diagrams of a method 500 for providing security to the mobile device 10 of FIG. 1C. Each of FIGS. 5A-5B includes interconnected flow charts from the points of view of the mobile device 10 and the server S, with vertical flows representing actions within each of those four elements, and horizontal flows representing actions between two or more of those four elements.

Beginning first with FIG. 5A, zones may be established in a monitoring area, such as the monitoring area 200 (FIG. 2), the monitoring area 300 (FIG. 3), or the monitoring area 400 (FIG. 4). The zones may be established using GPS only, beacons only, or by a combination of beacons and GPS. The zones may be established separately on each mobile devices 10. The zones may be first established on mobile devices 10 and then the zone definitions and characteristics, such as radius, may be tuned or changed by the server 128. An application 150, at block 501, may be installed on the device 10, either at the factory or at the monitoring area as devices are put out for display. At the time of installation, the zones may be set up for each device using GPS.

Continuing, at block 502 of the method 500, the device 10 may send its configuration data to the server 128. For instance, the device may register itself, its location, its zone definitions, etc. Next, at block 504, the server receives the configuration data from the device and updates an internal database with the information at block 506. Meanwhile, not shown, numerous other devices in the same monitoring area (or different monitoring area) will send their information to the server 128, which will update its database to store the data.

In one example, in which a server is used for management and monitoring, the server 128 at block 508 will modify the characteristics of one or more zone definitions of one or more devices. Next, the device 10 at block 510 will receive the configuration change and will at block 512 revise its configuration, including, e.g., the geo-radius, distance, direction, and or shape of the zone.

In another "server-less" example, the mobile device itself will configure the zones without need of a server. For example, the mobile device application 150 that is loaded onto the mobile device (e.g., at the factory or at a store) may include certain configuration features that allow the zones to be configured. Advantageously, this "server-less" mode of operation allows for the system to be comprised only of mobile devices, and eliminates the cost, ongoing management expense, and complexity of a server-based deployment. A person of ordinary skill in the art will readily understand that any of the features recited below that use a server could instead be deployed on one or more mobile devices when the system is operated in a "server-less" mode.

In the embodiment of FIG. 5A, the device 10 at block 514, based on GPS signals and the stored zone definitions, determines that entry into a first zone Z1 has occurred and at block 516 performs zone Z1 entry actions. Next, the device 10 at block 518, based on GPS signals and the stored zone definitions, determines that entry into a second zone Z2 has occurred and at block 520 performs zone Z2 entry actions, and optionally zone Z2 exit actions, if so configured.

In one example, the monitoring application 150 on the device 10 may deem that zone Z1 is its home zone, and the device 10 may allow normal operation of the device 10 by a user, while the monitoring application 150 recedes into the background so as not to impede the users interaction with the device 10.

In another example, the device 10 may take note of the zone Z2 entry and switch the user interface of the device to a different foreground application or message, or may perform any other action, such as locking out some device applications but not others depending on the zone that has been entered. In one specific security application, the camera may be disabled upon entry or exit to a specific zone that may include secret information that is not to be photographed. In another example, zone specific actions may disable access to non-secure internet subnets.

Next, the device 10 at block 522 enters the idle state, in which the device 10 is present in the same zone, and allows whatever access to the device by the user as has been indicated in the zone specific logic stored within the monitoring application 150. Again, the monitoring application 150 may continue to run in the background to detect zone exits and entries so that appropriate action may be taken.

FIG. 5B is a flow diagram illustrating additional details of the alarming techniques. The method 500 begins at block 530 with the processor 12 (see FIG. 1C) determining if the device 10 is located in a safe zone, e.g., zone Z1. For example, the processor 12 can determine this based on GPS coordinates of the mobile device 10 being within the previously set geo-radius, and maintain the device 10 within a normal operating mode at block 532. If the processor 12 determines the device enters zone Z2 (FIG. 2), which may be denoted as a caution zone, the processor 12 activates an alarm mode at block 534. When the device 10 transitions to the alarm mode, the alarm 16 of the mobile device 10 is activated at block 536. The alarm can have various trigger options. For example, in close proximity monitoring, the alarm 16 can be triggered when the device 10 is outside of a designated three to six foot radius. In another example, in large room monitoring, the alarm 16 can be triggered when the device 10 is beyond a fifty to seventy foot radius. As discussed above, the alarm 16 can be an audible alarm, visual alarm, or a combination thereof. In an embodiment, when the alarm 16 is activated during the alarm mode, the alarm 16 cannot be deactivated and the intensity of the alarm 16 cannot be lowered. For example, when the alarm 16 is an audible alarm, the volume of the alarm 16 cannot be lowered. The alarm issues directly from the mobile device 10, such as via a speaker at maximum volume. In an embodiment, when the alarm mode is activated, an alert email or message can be transmitted to a retail associate or manager. Notification of activation of the alarm mode is transmitted from the mobile device 10 to the server 128.

At block 538, the settings of the mobile device 10, such as the WiFi or cellular network settings, of the mobile device 10 are locked down to prevent the settings from being changed. Lockdown of these settings enables the mobile device 10 to continue to transmit data to the server 28 while the device 10 is in the alarm mode. Data can be monitored and the device data can be reset to factory settings. In addition, power button, device factory reset functionality, or program uninstall can be disabled to block device tampering and prevent the security measures from being removed from the device 10. In addition, an alarm screen can be activated to over-ride all activity of the device, rendering the device unusable. Furthermore, device proprietary information can be remotely deleted from the device 10. In addition, at block 538, the lockdown can include a lockdown of all buttons, and/or an activation lock so that the device is prevented from being activated or re-activated in the future.

At block 540, tracking of the mobile device 10 via the location tracker 22 is activated. In an embodiment, the location of each mobile device 10 is shown on a GPS map at all times, even when the device 10 is in a home location. In another embodiment, the location of a mobile device 10 is identified on a GPS map in response to activation of the alarm mode. Tracking of the device 10 via the location tracer 22 enables the device 10 to be retrieved in the event the device 10 is misplaced or stolen. In addition, a device inventory audit can be carried out without requiring a physical visit to each retail location. The data from the location tracker 22 can be transmitted to the server 28. In another embodiment, the location tracker 22 can emit a tracking signal that can be used, such as by authorities, to locate the device 10. In an alternative embodiment, the location of the beacon 30 and mobile device 10 is continually tracked or monitored, even when in a retail environment.

At block 542, the imaging device 18 is activated to gather image data. For example, the imaging device 18 can capture a still shot or video data of a physical environment or a person holding the device. The image data can be transmitted to the server 28, from which the image data can be made accessible, such as to authorities. In another embodiment, an image of a person enabling or disabling an alarm can be captured and transmitted to the server 28.

In an alternative embodiment, the alarm mode can be activated when entering a zone instead of when exiting a zone.

In yet another alternative embodiment, a combination of security methods can be employed in which beacons are used to establish both comfort zones and alarm zones.

Although the techniques set forth herein have been described with respect to specific usages, the method may be used in any situation in which establishment of zones is desired. Thus, the specific example embodiments are meant only to explain the technique, not limit the technique.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method for mobile device security of a plurality of mobile devices, each mobile device of the plurality of mobile devices comprising a global positioning system (GPS) tracker for locating the mobile device, the method comprising:
   establishing a zone boundary defining a first zone and a second zone in a monitoring area using the GPS tracker of each mobile device, wherein each mobile device is maintained in a first operating mode when each mobile device is located in the first zone and a second operating mode when each mobile device is located in the second zone;
   sending one or more characteristics of the zone boundary to a management system;
   each mobile device of the plurality of mobile devices receiving at least one change to the one or more characteristics of the zone boundary from the management system, wherein the at least one change is common to each mobile device of the plurality of mobile devices; and
   upon each mobile device being located outside the first zone for longer than a predetermined time period, performing alert actions.

2. The method of claim 1, wherein the mobile device security application is loaded on each mobile device locally.

3. The method of claim 1, wherein the management system comprises a map display to monitor locations of the plurality of mobile devices.

4. The method of claim 1, wherein the method further comprises ending the alert actions upon each mobile device re-entering the first zone.

5. The method of claim 1, wherein performing the alert actions further comprises disabling a factory reset capability of each mobile device.

6. The method of claim 1, wherein performing the alert actions further comprises disabling a power-off of each mobile device.

7. The method of claim 1, wherein the method further comprises activating, upon each mobile device leaving the first zone, one or more of a visible warning or an audible warning.

8. The method of claim 1, wherein the one or more characteristics of the zone boundary received from the management server comprises a change of the geographical radius of the zone boundary.

9. The method of claim 8, wherein the management server synchronizes the zone boundary with other zone boundaries defined by other devices managed by the management server.

10. A system for mobile device security comprising:
    a plurality of mobile devices, each mobile device comprising a global positioning system (GPS) tracker for locating each mobile device;
    a mobile device security application running on a processor of each mobile device;
    wherein the application establishes a zone boundary defining a first zone and a second zone in a monitoring area using the GPS tracker, wherein each mobile device is maintained in a first operating mode when each mobile device is located in the first zone and a second operating mode when each mobile device is located in the second zone;
    wherein the application running on each mobile device sends one or more characteristics of the zone boundary to a management system;
    wherein the application running on each mobile device receives at least one change to the one or more characteristics of the zone boundary from the management system; and
    wherein the application running on each mobile device, upon each mobile device being located outside the first zone for longer than a predetermined time period, performing alert actions.

11. The system of claim 10, wherein the mobile device security application running on each mobile device is loaded on each mobile device locally.

12. The system of claim 10, wherein the management system comprises a map display to monitor locations of the plurality of mobile devices.

13. The system of claim 10, wherein the application ends the alert actions upon each mobile device re-entering the first zone.

14. The system of claim 10, wherein performing the alert actions further comprises disabling a factory reset capability of each mobile device.

15. The system of claim 10, wherein performing the alert actions further comprises disabling a power-off of each mobile device.

16. The system of claim 10, wherein the application activates, upon each mobile device leaving the first zone, one or more of a visible warning or an audible warning.

17. The system of claim 10, wherein the one or more characteristics of the first zone received from the management server comprises a change of the geographical radius of the zone boundary.

18. The system of claim 17, wherein the management server synchronizes the zone boundary with other zone boundaries defined by other devices managed by the management server.

* * * * *